(12) United States Patent
Krenz et al.

(10) Patent No.: US 7,913,188 B1
(45) Date of Patent: Mar. 22, 2011

(54) GRAPHICAL SELECTION OF OBJECTS

(75) Inventors: Michael J. Krenz, Cedar Rapids, IA (US); Pamela K. Hahn, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 598 days.

(21) Appl. No.: 11/784,652

(22) Filed: Apr. 9, 2007

(51) Int. Cl.
  *G06F 3/048* (2006.01)
  *G06F 3/00* (2006.01)
  *G06F 3/033* (2006.01)
  *G08G 1/123* (2006.01)

(52) U.S. Cl. ........ 715/834; 715/846; 715/845; 715/700; 715/764; 345/184; 340/990; 340/995.16

(58) Field of Classification Search .................. 715/810, 715/856, 858, 865, 834, 845, 700, 846, 764; 345/156, 184; 340/995.16, 990
  See application file for complete search history.

(56) References Cited

U.S. PATENT DOCUMENTS

| | | | | |
|---|---|---|---|---|
| 5,404,443 A | * | 4/1995 | Hirata | 725/75 |
| 5,794,164 A | * | 8/1998 | Beckert et al. | 455/3.06 |
| 5,847,704 A | * | 12/1998 | Hartman | 715/764 |
| 5,940,076 A | * | 8/1999 | Sommers et al. | 715/834 |
| 6,124,861 A | * | 9/2000 | Lebovitz et al. | 715/808 |
| 6,201,540 B1 | * | 3/2001 | Gallup et al. | 715/764 |
| 6,202,008 B1 | * | 3/2001 | Beckert et al. | 701/33 |
| 6,229,456 B1 | * | 5/2001 | Engholm et al. | 341/35 |
| 6,295,060 B1 | * | 9/2001 | Lentz et al. | 715/764 |
| 6,404,420 B1 | * | 6/2002 | Klein et al. | 345/184 |
| 6,816,079 B1 | * | 11/2004 | Kuenzner et al. | 340/815.4 |
| 7,036,091 B1 | * | 4/2006 | Nguyen | 715/834 |
| 7,096,431 B2 | * | 8/2006 | Tambata et al. | 715/834 |
| 7,286,115 B2 | * | 10/2007 | Longe et al. | 345/168 |
| 7,506,275 B2 | * | 3/2009 | Conradt et al. | 715/857 |
| 7,600,201 B2 | * | 10/2009 | Endler et al. | 715/863 |
| 2004/0095366 A1 | * | 5/2004 | Kawai et al. | 345/700 |
| 2005/0083300 A1 | * | 4/2005 | Castle | 345/157 |
| 2006/0026537 A1 | * | 2/2006 | L'Heureux | 715/863 |
| 2007/0136690 A1 | * | 6/2007 | MacLaurin et al. | 715/822 |

* cited by examiner

*Primary Examiner* — Tadesse Hailu
*Assistant Examiner* — Nicholas S Ulrich
(74) *Attorney, Agent, or Firm* — Matthew J. Evans; Daniel M. Barbieri

(57) ABSTRACT

The present invention is directed to the graphical selection of objects. A selection indicator, one or more object indicators, and a position indicator are presented on a display. The selection indicator may be manipulated to indicate object indicators by rotating the selection indicator until an object indicators is within the area of the selection indicator and to select an object indicator which has been indicated. The selection indicator may be rotated so a portion overlaps with the location occupied by a portion prior to rotation. A menu indicator is also presented on the display. The menu indicator comprises a selector icon and a list of representations of the object indicators indicated by selection indicator. The selector icon may be manipulated to indicate a single representation of an object indicator and to select the object indicator represented by the representation of the indicated object indicator.

15 Claims, 8 Drawing Sheets

GRAPHICAL SELECTION OF OBJECTS

FIELD OF THE INVENTION

The present invention relates generally to selection devices and more particularly to graphical selection of objects.

BACKGROUND OF THE INVENTION

Graphical flight planning is still in its very early implementation within the flight industry in general. One of the biggest problems has been the method of selecting "randomly placed" objects, such as items on a map, quickly and accurately utilizing any type of cursor control device.

Selecting "randomly placed" objects, such as items on a map, utilizing smooth cursors (such as a mouse pointer) can be problematic in non-ideal environments (such as moving vehicles). Turbulence or vibration can make it difficult to precisely select a small target object. Precise selection of overlapping selectable objects is also an issue.

Consequently, it would be desirable to provide graphical selection of objects which is capable of precisely selecting objects and precisely selecting overlapping selectable objects in non-ideal environments.

SUMMARY OF THE INVENTION

Accordingly, the present invention is directed to graphical selection of objects capable of precisely selecting objects and precisely selecting overlapping selectable objects in non-ideal environments.

A selection indicator, one or more object indicators, and a position indicator are presented on a display. The selection indicator may be manipulated by rotating it around the position indicator. Alternatively, the selection indicator may be manipulated to alter its position on the display horizontally or vertically. The selection indicator may be manipulated to indicate object indicators by rotating the selection indicator until object indicators are within the area of the selection indicator. The selection indicator may be manipulated to select an object indicator which has been indicated by the selection indicator. The selection indicator may be rotated such that a portion of the selection indicator occupies a portion of the display subsequent to rotation which was occupied by a portion of the selection indicator prior to rotation. This overlap ensures that no object indicators will fall between rotation increments of the selection indicator and be thus not selectable.

A menu indicator is also presented on the display. The menu indicator comprises a selector icon and a list of representations of the object indicators indicated by selection indicator. The selector icon may be manipulated to indicate a representation of an object indicator indicated by the selection indicator and to select the object indicator represented by the representation of the indicated object indicator indicated by the selector icon. In this way, precise selection of multiple object indicators indicated by the selection indicator is achieved.

The present invention provides graphical selection of "randomly placed" objects, such as items on a map, suitable for utilization in non-ideal environments, such as moving vehicles. Target objects can be selected despite turbulence or vibration. Precise selection of overlapping selectable objects can also be performed.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to exemplary embodiments of the invention, examples of which are illustrated in the accompanying drawings.

Figure 1:
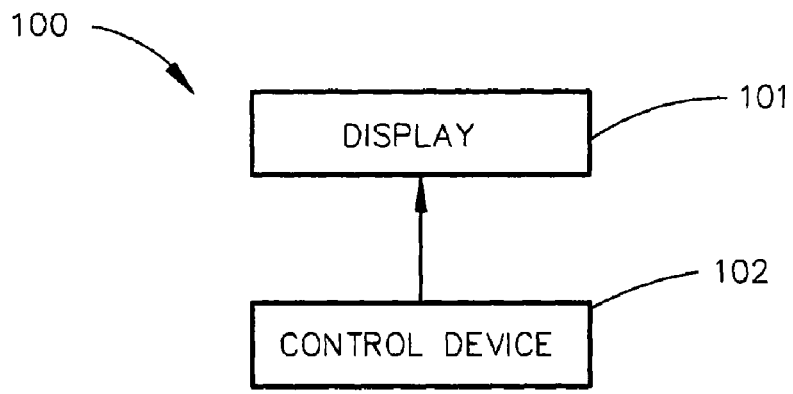
FIG. 1 is a block diagram illustrating a graphical selection apparatus, in accordance with an exemplary embodiment of the present invention.

Referring generally to FIG. 1; a graphical selection apparatus 100, in accordance with an exemplary embodiment of the present invention, is illustrated. The graphical selection apparatus 100 comprises a display 101 and a control device 102 coupled to the display 101. Control device 102 is operable to manipulate graphical elements displayed on display 101. Control device 102 may be operable to zoom in on or zoom out of the graphical elements displayed on display 101. Control device 102 may comprise one or more of any kind of controls for manipulating display 101 including, but not limited to, a button, a lever, a touch screen, a knob, a scroll wheel, a track ball, a switch, a dial, a sliding bar, a scroll bar, a slider, a handle, a pull, a touch pad, a track pad, a paddle, a steering wheel, a keyboard, a key pad, and a joystick.

Figure 2:
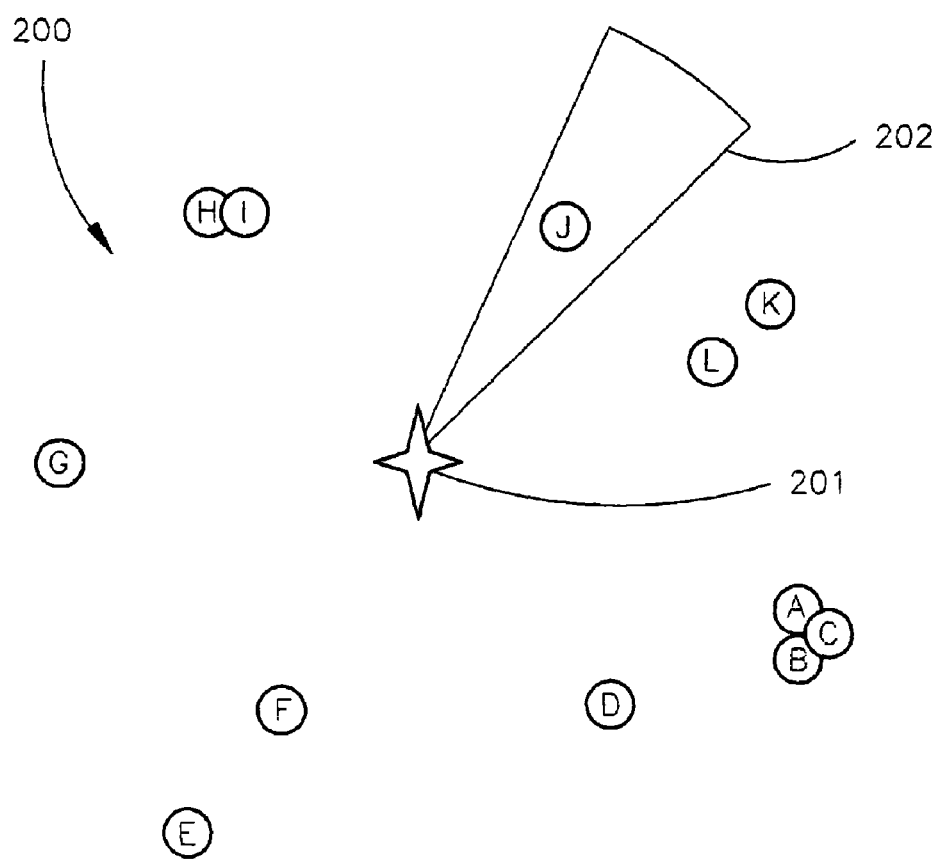
FIG. 2 is a block diagram illustrating the display for a graphical selection apparatus, in accordance with an exemplary embodiment of the present invention.

Referring now to FIG. 2; a display 200 for a graphical selection apparatus, in accordance with an exemplary embodiment of the present invention, is illustrated. Display 200 may comprise the display 101 for the graphical selection apparatus 100 illustrated in FIG. 1. Display 200 includes position indicator 201 and selection indicator 202. As illustrated, display 200 includes object indicators A through L. Alternatively, display 200 may include more or less object indicators, such as a hundred or none. As illustrated, object indicators A through L are circles identified by letters. Alternatively, object indicators may be represented by any visual metaphor, such as squares or other shapes, text, or dots.

As illustrated, position indicator 201 is shown as a star. Alternatively, position indicator 201 may be represented by any visual metaphor, such as a circle or other shape, text, a spot, or even a blank. As illustrated, selection indicator 202 is shown as a pie wedge extending outward from position indicator 201. Alternatively, selection indicator 202 may be represented by any visual metaphor occupying an area of display 200 (such as a box, a circle, a square, a diamond, or text) and may be a distance away from position indicator 201.

Selection indicator 202 may be manipulated by rotating it around a center of rotation. Alternatively, selection indicator 202 may be manipulated by altering its position on display 200 horizontally or vertically. Position indicator 201 may represent the center of rotation for selection indicator 202. Selection indicator 202 may be manipulated to alter the depth and range of the area of selection indicator 202. As illustrated, selection indicator 202 is a pie-shaped wedge. The pie-shaped wedge may be manipulated to be longer, shorter, wider, narrower, differently shaped, or the like. Selection indicator 202 may be manipulated to indicate object indicators by rotating selection indicator 202 until object indicators are within the area of selection indicator 202. Selection indicator 202 may be manipulated to select an object indicator which has been indicated by selection indicator 202. Selection indicator 202 may be manipulated utilizing a control device such as control device 102 for the graphical selection apparatus 100 in FIG. 1.

Figure 3:
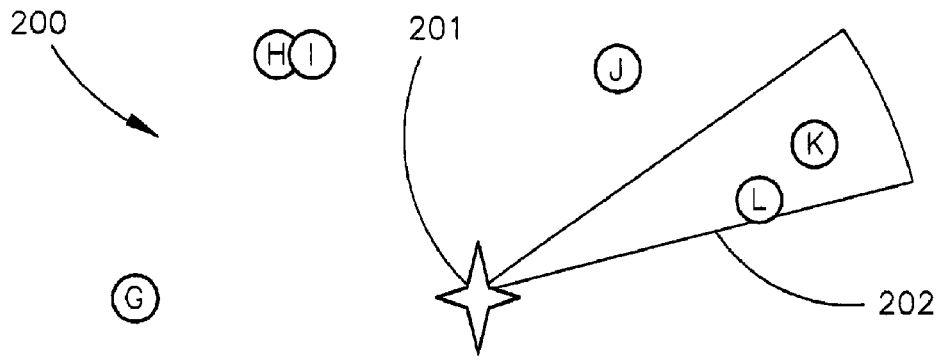
FIG. 3 is a block diagram illustrating the display for a graphical selection apparatus, in accordance with an exemplary embodiment of the present invention.
Figure 4:
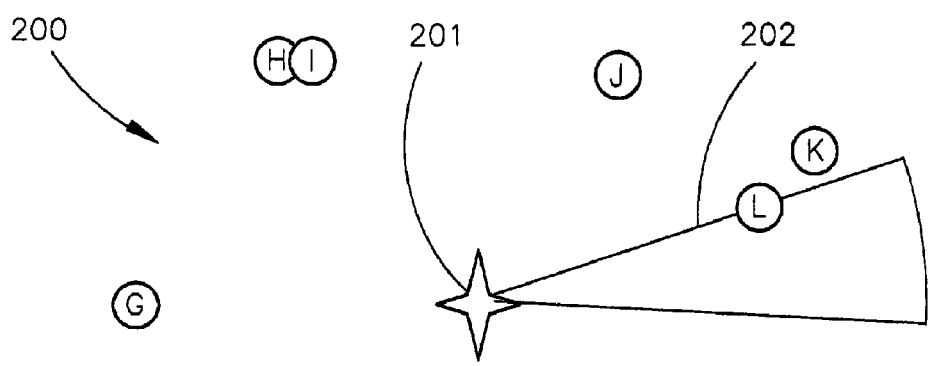
FIG. 4 is a block diagram illustrating the display for a graphical selection apparatus, in accordance with an exemplary embodiment of the present invention.

As illustrated, in FIG. 2 selection indicator 202 is indicating object indicator J. Now referring to FIG. 3, selection indicator 202 has been rotated to indicate object indicators K and L. Now referring to FIG. 4, selection indicator 202 has been further rotated to indicate object indicator L. Now referring to FIG. 5, selection indicator 202 has been still further rotated to indicate object indicators A, B, and C.

As was described in the paragraph above, selection indicator 202 may be rotated clockwise. Alternatively, selection indicator 202 may be rotated counter clockwise. Selection indicator 202 may be manipulated to rotate at different speeds and in different increments. Selection indicator 202 may be manipulated to rotate in controlled increments. Alternatively, selection indicator 202 may rotate automatically and may be manipulated to stop rotating or to switch direction of rotation. Selection indicator 202 may be rotated such that a portion of selection indicator 202 occupies a portion of display 200 subsequent to rotation which was occupied by a portion of selection indicator 202 prior to rotation. This overlap ensures that no object indicators will fall between rotation increments of selection indicator 202 and be thus not selectable. Selection indicator 202 may be manipulated and rotated utilizing a control device such as control device 102 for the graphical selection apparatus 100 in FIG. 1.

As illustrated, position indicator 201 is located in the center of display 200. Alternatively, position indicator 201 may be located anywhere on display 200. The center of rotation (or position indicator 201), which selection indicator 202 rotates around, may be manipulated to change position to a different location on display 200. The center of rotation (or position indicator) may be manipulated utilizing a control device such as control device 102 for the graphical selection apparatus 100 in FIG. 1.

Figure 5:
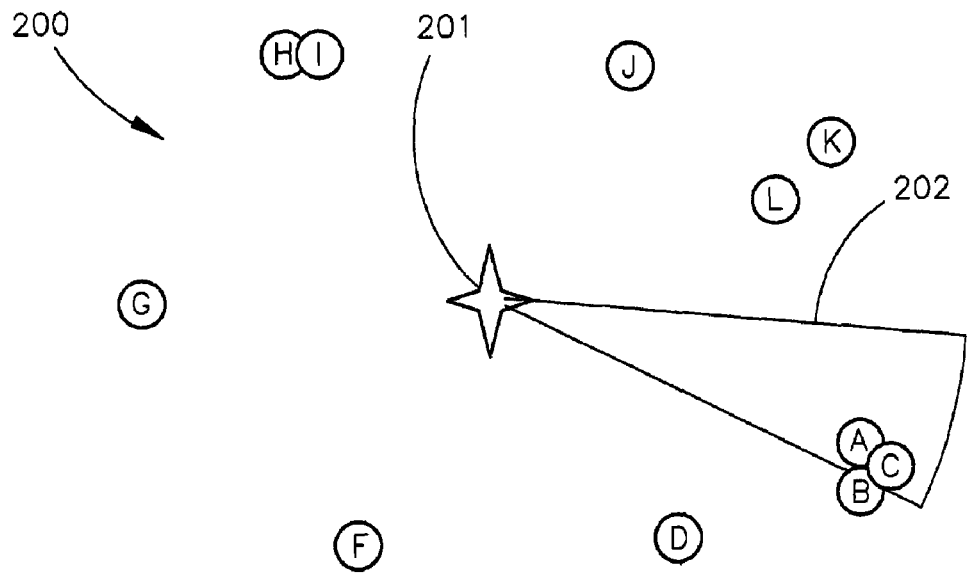
FIG. 5 is a block diagram illustrating the display for a graphical selection apparatus, in accordance with an exemplary embodiment of the present invention.
Figure 6:
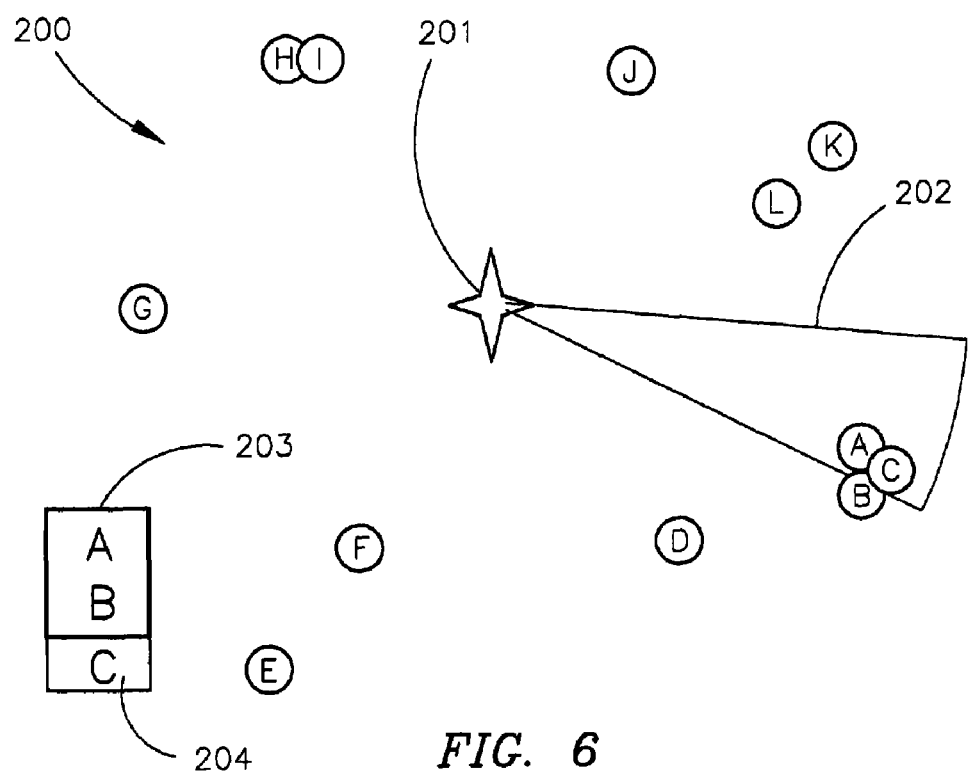
FIG. 6 is a block diagram illustrating the display for a graphical selection apparatus, in accordance with an exemplary embodiment of the present invention.

Selection indicator 202 may indicate multiple object indicators, as illustrated in FIG. 5 wherein selection indicator 202 indicates object indicators A, B, and C. It may be desired to select a single object indicator in such a situation. Referring now to FIG. 6, display 200 may further include menu indicator 203. Menu indicator 203 may only be presented on display 200 when multiple object indicators have been indicated by selection indicator 202. Alternatively, menu indicator 203 may always be presented on display 200. Menu indicator 203 may comprise a list (which may be ordered or unordered) of representations of the object indicators indicated by selection indicator 202. Alternatively, menu indicator 203 may comprise any other arrangement of representations of the object indicators indicated by selection indicator 202, such as a grid or a queue. Menu indicator 203 may further comprise selector icon 204. As illustrated, selector icon 204 comprises a square. Alternatively, selector icon 204 may be represented by any visual metaphor, such as a shape, a line, an arrow, a color, or text. Selector icon 204 may be manipulated to indicate a representation of an object indicator indicated by selection indicator 202. Selector icon 204 may indicate a representation of an object indicator indicated by selection indicator 202 when the representation is within the area of the selector icon 204. As illustrated, the representation of object indicator C is indicated by selector icon 204. Selector icon 204 may be manipulated to select the object indicator represented by the representation of the indicated object indicator indicated by selector icon 204. Selection icon 204 may be manipulated utilizing a control device such as control device 102 for the graphical selection apparatus 100 in FIG. 1.

The present invention provides graphical selection of "randomly placed" objects, such as items on a map. The present invention may be utilized in graphical flight planning. For example, the present invention may be utilized to select a destination city for an aircraft from a map including, but not limited to, a map of the United States. The present invention may also be utilized to select which airport an aircraft intends to land at from a map including, but not limited to, the state of New York. The present invention may also be utilized to select an aircraft out of a display of a group of aircraft in an area for purposes of including, but not limited to, tracking the aircraft and obtaining information about the aircraft.

Figure 7:
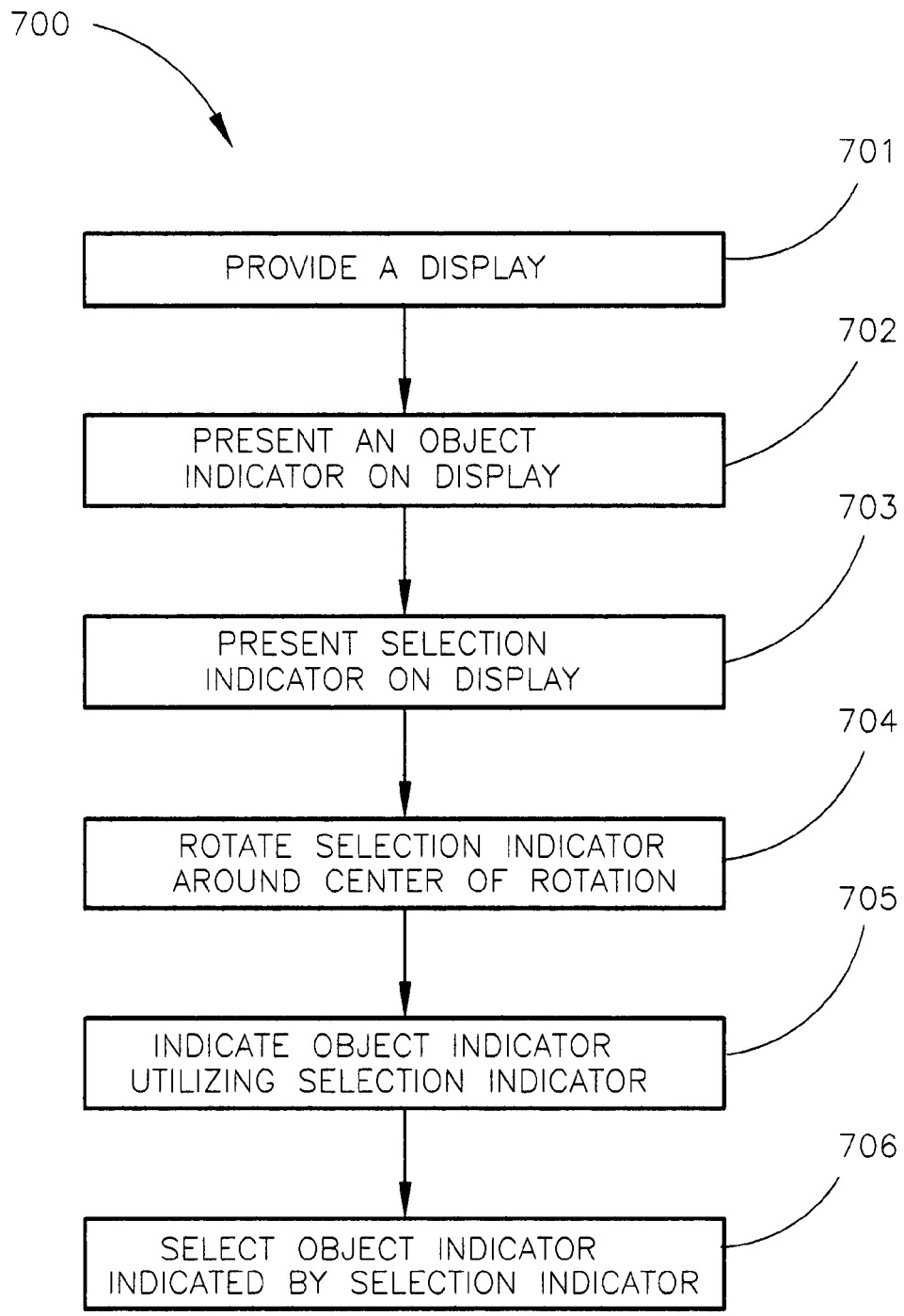
FIG. 7 is a flow chart illustrating a method of graphically selecting an object, in accordance with an exemplary embodiment of the present invention.

Referring now to FIG. 7; a method 700 of graphically selecting an object, in accordance with an exemplary embodiment of the present invention, is shown. In step 701, a display is provided. The display may be operable to zoom in on or zoom out of whatever is displayed on the display. In step 702, an object indicator is presented on the display. The object indicator may be presented as any visual metaphor, such as a circle or other shape, text, or a dot. In step 703, a selection indicator is presented on the display. The selection indicator may be represented by any visual metaphor, such as a pie-shaped wedge, a box, a circle, a square, a diamond, or text. In step 704, the selection indicator is rotated around a center of rotation. Alternatively, the selection indicator may be manipulated by altering its position on the display horizontally or vertically. The selection indicator may be rotated clockwise or counterclockwise. The selection indicator may be rotated at various speeds and increments. The selection indicator may be rotated in controlled increments. Alternatively, the selection indicator may rotate automatically and be manipulated to stop rotating or to switch direction of rotation. The selection indicator may be rotated such that a portion of the selection indicator subsequent to rotation occupies a portion of the display occupied by a portion of the selection indicator prior to rotation. In step 705, an object indicator is indicated utilizing the selection indicator. The selection indicator may be utilized to indicate an object indicator by rotating the selection indicator until the object indicator is within the area of the display occupied by the selection indicator. In step 706, an object indicator indicated by the selection indicator is selected.

Figure 8:
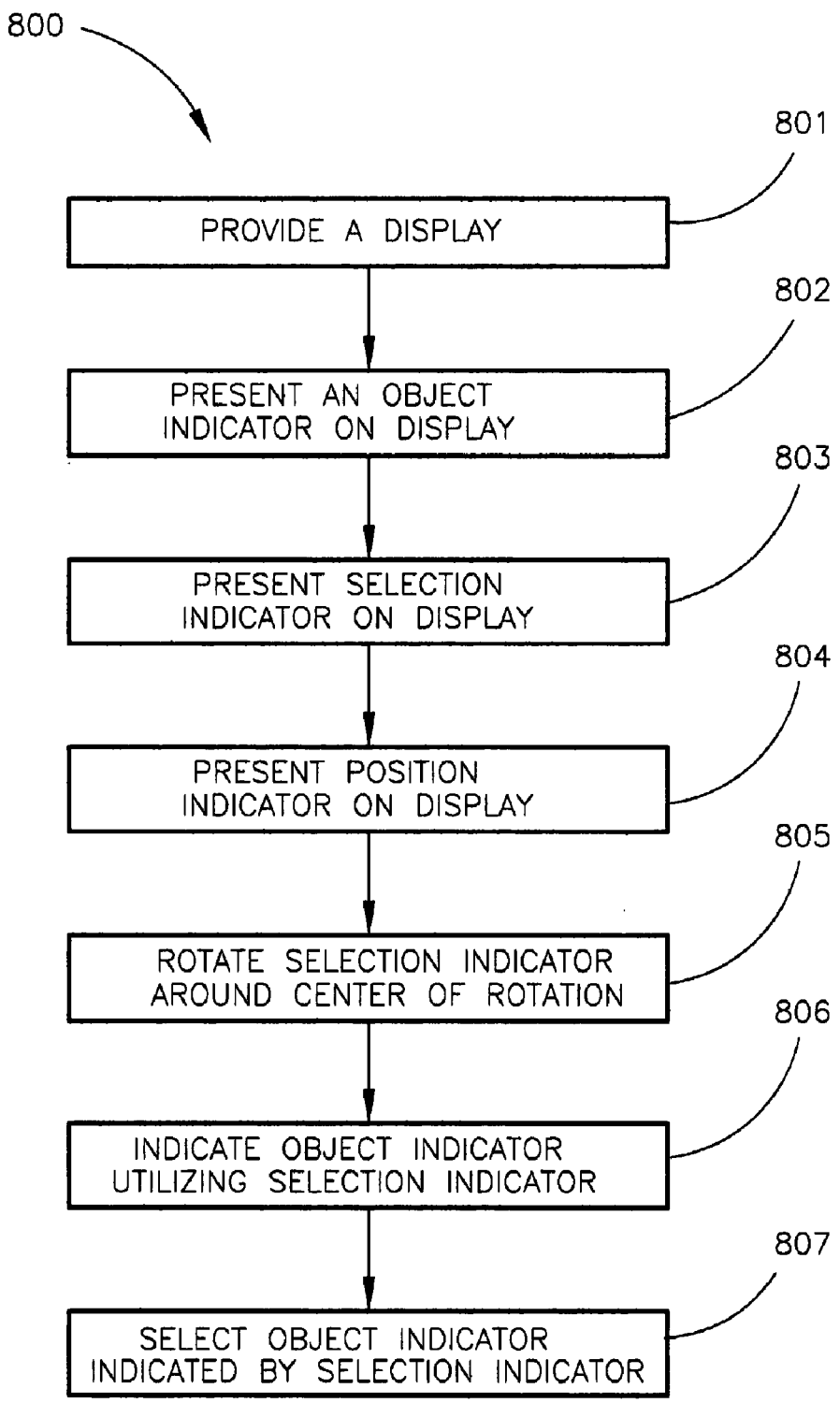
FIG. 8 is a flow chart illustrating a method of graphically selecting an object, in accordance with an alternative embodiment of the present invention.

Referring now to FIG. 8; a method 800 of graphically selecting an object, in accordance with an alternative embodiment of the present invention, is shown. In step 801, a display is provided. The display may be operable to zoom in on or zoom out of whatever is displayed on the display. In step 802, an object indicator is presented on the display. The object indicator may be presented as any visual metaphor, such as a circle or other shape, text, or a dot. In step 803, a selection indicator is presented on the display. The selection indicator may be represented by any visual metaphor, such as a pie-shaped wedge, a box, a circle, a square, a diamond, or text. In step 804, a position indicator is presented on the display. The position indicator may be represented by any visual metaphor, such as a star, a circle or other shape, text, a spot, or even a blank. In step 805, the selection indicator is rotated around a center of rotation. Alternatively, the selection indicator may be manipulated by altering its position on the display horizontally or vertically. The selection indicator may be rotated clockwise or counterclockwise. The selection indicator may be rotated at various speeds and increments. The selection indicator may be rotated in controlled increments. Alternatively, the selection indicator may rotate automatically and be manipulated to stop rotating or to switch direction of rotation. The selection indicator may be rotated such that a portion of the selection indicator subsequent to rotation occupies a portion of the display occupied by a portion of the selection indicator prior to rotation. The position indicator may represent the center of rotation for the selection indicator. In step 806, an object indicator is indicated utilizing the selection indicator. The selection indicator may be utilized to indicate an object indicator by rotating the selection indicator until the object indicator is within the area of the display occupied by the selection indicator. In step 807, an object indicator indicated by the selection indicator is selected.

Figure 9:
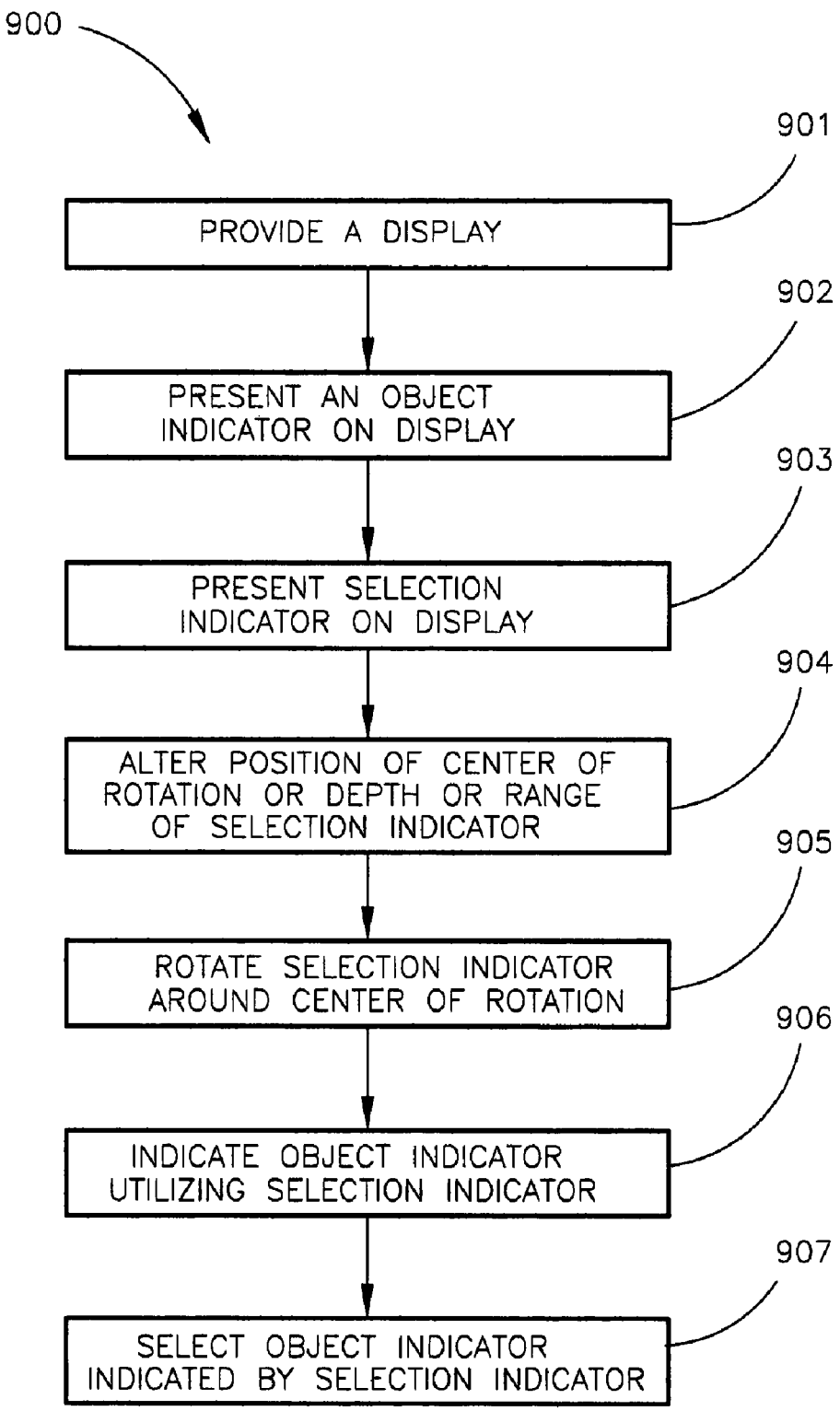
FIG. 9 is a flow chart illustrating a method of graphically selecting an object, in accordance with an alternative embodiment of the present invention.

Referring now to FIG. 9; a method 900 of graphically selecting an object, in accordance with an alternative embodiment of the present invention, is shown. In step 901, a display is provided. The display may be operable to zoom in on or zoom out of whatever is displayed on the display. In step 902, an object indicator is presented on the display. The object indicator may be presented as any visual metaphor, such as a circle or other shape, text, or a dot. In step 903, a selection indicator is presented on the display. The selection indicator may be represented by any visual metaphor, such as a pie-shaped wedge, a box, a circle, a square, a diamond, or text. In step 904, the position of the center of rotation or the depth or range of the selection indicator is altered. The position of the center of rotation may be altered to locate the position of the center of rotation anywhere on the display. The depth or range of the selection indicator may be altered such that the selection indicator is longer, shorter, wider, narrower, differently shaped, or the like. In step 905, the selection indicator is rotated around a center of rotation. Alternatively, the selection indicator may be manipulated by altering its position on the display horizontally or vertically. The selection indicator may be rotated clockwise or counterclockwise. The selection indicator may be rotated at various speeds and increments. The selection indicator may be rotated in controlled increments. Alternatively, the selection indicator may rotate automati-cally and be manipulated to stop rotating or to switch direction of rotation. The selection indicator may be rotated such that a portion of the selection indicator subsequent to rotation occupies a portion of the display occupied by a portion of the selection indicator prior to rotation. In step 906, an object indicator is indicated utilizing the selection indicator. The selection indicator may be utilized to indicate an object indicator by rotating the selection indicator until the object indicator is within the area of the display occupied by the selection indicator. In step 907, an object indicator indicated by the selection indicator is selected.

Figure 10:
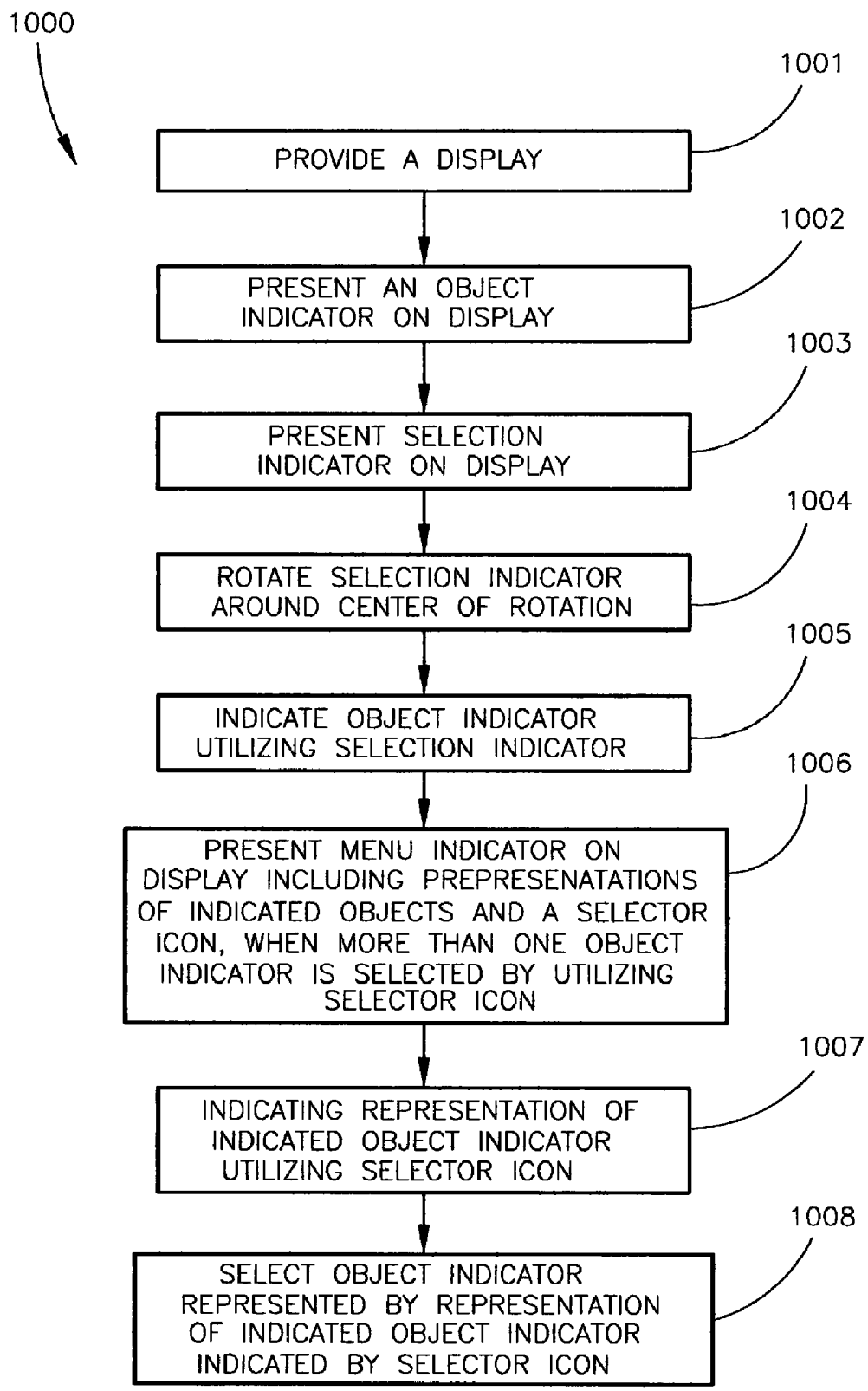
FIG. 10 is a flow chart illustrating a method of graphically selecting an object, in accordance with an alternative embodiment of the present invention.

Referring now to FIG. 10; a method 1000 of graphically selecting an object, in accordance with an alternative embodiment of the present invention, is shown. In step 1001, a display is provided. The display may be operable to zoom in on or zoom out of whatever is displayed on the display. In step 1002, an object indicator is presented on the display. The object indicator may be presented as any visual metaphor, such as a circle or other shape, text, or a dot. In step 1003, a selection indicator is presented on the display. The selection indicator may be represented by any visual metaphor, such as a pie-shaped wedge, a box, a circle, a square, a diamond, or text. In step 1004, the selection indicator is rotated around a center of rotation. Alternatively, the selection indicator may be manipulated by altering its position on the display horizontally or vertically. The selection indicator may be rotated clockwise or counterclockwise. The selection indicator may be rotated at various speeds and increments. The selection indicator may be rotated in controlled increments. Alternatively, the selection indicator may rotate automatically and be manipulated to stop rotating or to switch direction of rotation. The selection indicator may be rotated such that a portion of the selection indicator subsequent to rotation occupies a portion of the display occupied by a portion of the selection indicator prior to rotation. In step 1005, an object indicator is indicated utilizing the selection indicator. The selection indicator may be utilized to indicate an object indicator by rotating the selection indicator until the object indicator is within the area of the display occupied by the selection indicator. In step 1006, a menu indicator, including representations of indicated object indicators and a selector icon, is presented on the display. The menu indicator may be presented on the display only when multiple object indicators have been indicated by the selection indicator. Alternatively, the menu indicator may always be presented on the display. The menu indicator may comprise a list (ordered or unordered) or other arrangement (such as a grid or queue) of representations of the object indicators indicated by the selection indicator. The menu indicator includes a selector icon. The selector icon may be represented as any visual metaphor, such as a square or other shape, a line, an arrow, a color, or text. In step 1007, a representation of a selected object indicator is indicated utilizing the selector icon. The selector icon may be utilized to indicate a representation of a selected object indicator by manipulating the selector icon until the representation of the selected object indicator is within the area of the menu indicator occupied by the selector icon. In step 1008, the object indicator represented by the representation of an indicated object indicator indicated by the selector icon is selected.

Figure 11:
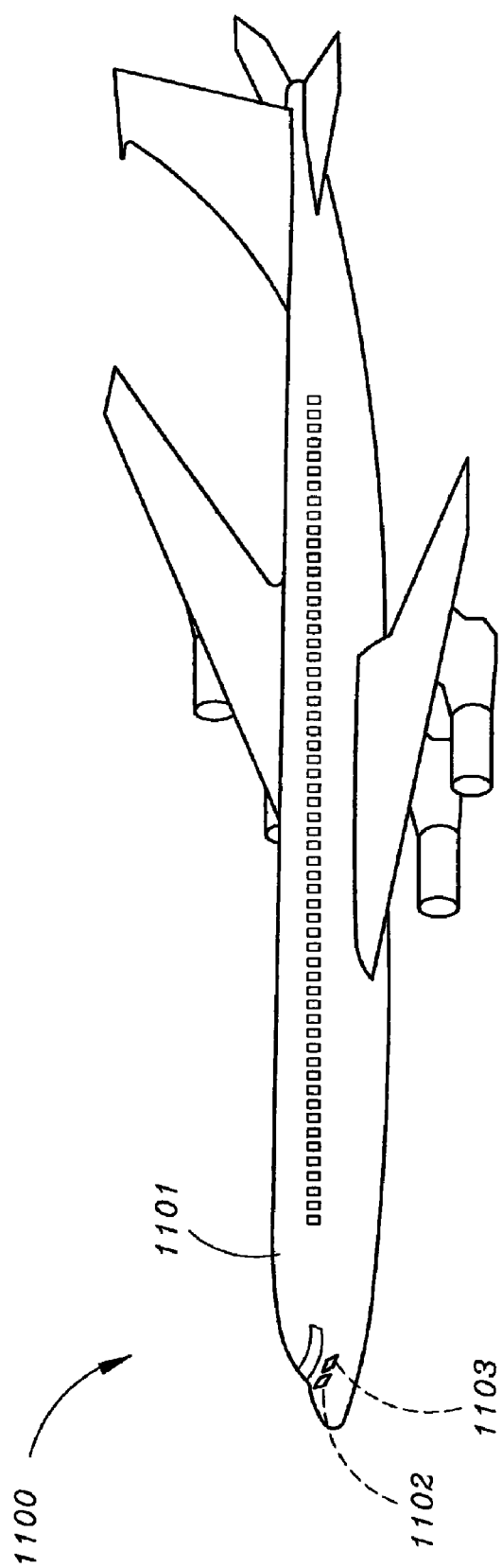
FIG. 11 is a block diagram illustrating a system for graphically selecting objects on a display for a vehicle, in accordance with an alternative embodiment of the present invention.

Referring now to FIG. 11, a system 1100 for graphically selecting objects on a display for a vehicle, in accordance with an alternative embodiment of the present invention, is shown. The system 1100 includes a vehicle 1101, a display 1102, and a control device 1103. Control device 1103 is operable to manipulate graphical elements displayed on display 1102. Control device 1103 may be operable to zoom in on or zoom out of the graphical elements displayed on display 1102.

Control device 1103 may comprise one or more of any kind of controls for manipulating display 1102 including, but not limited to, a button, a lever, a touch screen, a knob, a scroll wheel, a track ball, a switch, a dial, a sliding bar, a scroll bar, a slider, a handle, a pull, a touch pad, a track pad, a paddle, a steering wheel, a keyboard, a key pad, and a joystick.

Display 1102 includes a selection indicator, one or more object indicators, and may include a position indicator. The object indicators may be represented by any visual metaphor, such as squares or other shapes, text, or dots. The position indicator may be represented by any visual metaphor, such as a circle or other shape, text, a spot, or even a blank. The selection indicator may be represented by any visual metaphor occupying an area of display (such as a box, a circle, a square, a diamond, or text).

The selection indicator may be manipulated by rotating it around a center of rotation. Alternatively, the selection indicator may be manipulated by altering its position on the display horizontally or vertically. The position indicator may represent the center of rotation for the selection indicator. The selection indicator may be manipulated to alter the depth and range of the area of the selection indicator such that the selection indicator is longer, shorter, wider, narrower, or the like. The selection indicator may be manipulated to indicate object indicators by rotating the selection indicator until object indicators are within the area of the selection indicator. The selection indicator may be manipulated to select an object indicator which has been indicated by the selection indicator. The selection indicator may be rotated clockwise or counterclockwise. The selection indicator may be manipulated to rotate at various speeds and in various increments. The selection indicator may be manipulated to rotate in controlled increments. Alternatively, the selection indicator may rotate automatically and may be manipulated to stop rotating or to switch direction of rotation. The selection indicator may be rotated such that a portion of the selection indicator occupies a portion of the display 1102 subsequent to rotation which was occupied by a portion of the selection indicator prior to rotation. This overlap ensures that no object indicators will fall between rotation increments of the selection indicator and be thus not selectable. The selection indicator may be manipulated utilizing the control device 1103.

The position indicator may be located anywhere on the display 1102. The center of rotation (or position indicator), which the selection indicator rotates around, may be manipulated to change position to a different location on the display 1102. The center of rotation (or position indicator) may be manipulated utilizing the control device 1103.

The selection indicator may indicate multiple object indicators. It may be desired to select a single object indicator in such a situation. The display 1102 may further include a menu indicator. The menu indicator may only be presented on the display 1102 when multiple object indicators have been indicated by the selection indicator. Alternatively, the menu indicator may always be presented on the display 1102. The menu indicator may comprise a list (which may be ordered or unordered) of representations of the object indicators indicated by selection indicator or any other arrangement of representations of the object indicators indicated by selection indicator (such as a grid or a queue). The menu indicator may further comprise selector icon. The selector icon may be represented by any visual metaphor, such as a shape, a line, an arrow, a color, or text. The selector icon may be manipulated to indicate a representation of an object indicator indicated by the selection indicator and to select the object indicator represented by the representation of the indicated object indicator indicated by the selector icon. The selection icon may be manipulated utilizing the control device 1103.

The present invention provides graphical selection of "randomly placed" objects, such as items on a map, suitable for utilization in non-ideal environments, such as moving vehicles. Target objects can be selected despite turbulence or vibration. Precise selection of overlapping selectable objects can also be performed.

It is understood that the present invention is not limited to any underlying implementing technology. The present invention may be implemented utilizing any combination of software and hardware technology. The present invention may be implemented using a variety of technologies without departing from the scope and spirit of the invention or without sacrificing all of its material advantages.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A graphical selection apparatus, comprising:
    a display which includes graphical elements, at least one object indicator and a selection indicator; and
    a control device, coupled to the display;
    wherein the selection indicator has an area which occupies a portion of the display and automatically begins rotation around a center of rotation, the control device is operable to zoom in or zoom out of graphical elements on said display, stop rotation of the selection indicator around the center of rotation and select the object indicator indicated by the selection indicator, and
    wherein the area of the selection indicator has a depth and a range, the center of rotation has a position, and the control device is operable to alter the depth of the selection indicator, the range of the selection indicator, and the position of the center of rotation.

2. The graphical selection apparatus as claimed in claim 1, wherein the display further includes a position indicator which represents the center of rotation.

3. The graphical selection apparatus as claimed in claim 1, wherein the selection indicator is rotated in increments such that subsequent to rotation a portion of the area of the selection indicator occupies a portion of the display which the area of the selection indicator previously occupied before rotation.

4. The graphical selection apparatus as claimed in claim 1, wherein the area of the selection indicator comprises one selected from a pie-shaped wedge, a box, a circle, a triangle, a square, a diamond, a rectangle, a polygon, and an irregular shape.

5. The graphical selection apparatus as claimed in claim 1, wherein the display further includes a menu indicator when more than one object indicator is indicated by the selection indicator, the menu indicator including at least one representation of an indicated object indicator and a selector icon wherein the control device is operable to indicate the representation of the indicated object indicator utilizing the selector icon and select the object indicator represented by the representation of the indicated object indicator indicated by the selector icon.

6. The graphical selection apparatus as claimed in claim 5, wherein the menu indicator comprises a list of at least one representation of an indicated object indicator.

7. A system for graphically selecting objects on a display for a vehicle, comprising:
a vehicle;
a display, said display including graphical elements; and
a control device;
wherein at least one object indicator is presented on the display, a selection indicator with an area which occupies a portion of the display is presented on the display and automatically begins rotation around a center of rotation, the control device is operable to zoom in or zoom out of graphical elements on said display and stop rotation of the selection indicator around the center of rotation, the control device is operable to indicate the object indicator utilizing the selection indicator when the object indicator is within the area of the selection indicator, and the control device is operable to select the object indicator indicated by the selection indicator, wherein the area of the selection indicator has a depth and a range, the center of rotation has a position, and the control device is operable to alter the depth of the selection indicator, the range of the selection indicator, and the position of the center of rotation.

8. The system as claimed in claim 7, wherein a position indicator is presented on the display which represents the center of rotation.

9. The system as claimed in claim 7, wherein the selection indicator is rotated in increments such that subsequent to rotation a portion of the area of the selection indicator occupies a portion of the display which the area of the selection indicator previously occupied before rotation.

10. The system as claimed in claim 7, wherein the area of the selection indicator comprises one selected from a pie-shaped wedge, a box, a circle, a triangle, a square, a diamond, a rectangle, a polygon, and an irregular shape.

11. The system as claimed in claim 7, wherein a menu indicator is presented on the display when more than one object indicator is indicated by the selection indicator, the menu indicator including at least one representation of an indicated object indicator and a selector icon wherein the control device is operable to indicate the representation of the indicated object indicator utilizing the selector icon and select the object indicator represented by the representation of the indicated object indicator indicated by the selector icon.

12. The system as claimed in claim 11, wherein the menu indicator comprises a list of at least one representation of an indicated object indicator.

13. A system for graphically selecting objects, comprising:
a display, said display including graphical elements; and
a control device;
wherein at least one object indicator is presented on the display, a selection indicator with an area which occupies a portion of the display is presented on the display and automatically begins rotation around a center of rotation; the control device is operable to zoom in or zoom out of graphical elements on said display and stop rotation of the selection indicator around the center of rotation, the control device is operable to alter the portion of the display occupied by the area of the selection indicator such that subsequent to alteration a portion of the area of the selection indicator occupies a portion of the display which the area of the selection indicator previously occupied before alteration, the area of the selection indicator comprises a pie-shaped wedge, the control device is operable to indicate the object indicator utilizing the selection indicator when the object indicator is within the area of the selection indicator; and the control device is operable to select the object indicator indicated by the selection indicator.

14. The system as claimed in claim 13, wherein a menu indicator, comprising a list of at least one representation of an indicated object indicator and a selector icon, is presented on the display when more than one object indicator is indicated by the selection indicator wherein the control device is operable to indicate the representation of the indicated object indicator utilizing the selector icon and select the object indicator represented by the representation of the indicated object indicator indicated by the selector icon.

15. The system as claimed in claim 13, wherein the area of the selection indicator has a depth and a range and the control device is operable to alter the depth of the selection indicator and the range of the selection indicator.

* * * * *